United States Patent [19]
Charzinski et al.

[11] Patent Number: 6,087,929
[45] Date of Patent: Jul. 11, 2000

[54] INDICATION DEVICE

[75] Inventors: Uwe Charzinski, Stuttgart; Jochen Horwath, Unterensingen; Hartwig Mueller, Stuttgart; Gerald Ricklefs, Kernen; Friedrich Scheurer, Ostfildern, all of Germany

[73] Assignee: DaimlerChrysler AG, Stuttgart, Germany

[21] Appl. No.: 09/194,390

[22] PCT Filed: May 17, 1997

[86] PCT No.: PCT/EP97/02537

§ 371 Date: Sep. 7, 1999

§ 102(e) Date: Sep. 7, 1999

[87] PCT Pub. No.: WO97/46977

PCT Pub. Date: Dec. 11, 1997

[30] Foreign Application Priority Data

May 31, 1996 [DE] Germany .......................... 196 21 941

[51] Int. Cl.$^7$ ............................................ B60Q 1/00
[52] U.S. Cl. ................................. 340/439; 340/461
[58] Field of Search ........................... 340/439, 461, 340/462, 425.5, 459, 525; 307/10.3, 10.6

[56] References Cited

U.S. PATENT DOCUMENTS

| | | | |
|---|---|---|---|
| 4,053,868 | 10/1977 | Cox et al. | 340/461 |
| 4,447,801 | 5/1984 | Masuda | 340/52 F |
| 5,006,829 | 4/1991 | Miyamoto et al. | 340/459 |
| 5,241,295 | 8/1993 | Madau | 340/461 |
| 5,243,324 | 9/1993 | Bober | 340/439 |
| 5,307,050 | 4/1994 | Patton et al. | 340/461 |
| 5,325,082 | 6/1994 | Rodriguez | 340/439 |
| 5,430,432 | 7/1995 | Camhi et al. | 340/439 |
| 5,525,959 | 6/1996 | Przybyla et al. | 340/439 |

FOREIGN PATENT DOCUMENTS

| | | |
|---|---|---|
| 0 005 436 | 11/1979 | European Pat. Off. . |
| 0 072 000 | 2/1983 | European Pat. Off. . |
| 0 308 944 | 3/1989 | European Pat. Off. . |
| 28 54 302 | 6/1979 | Germany . |
| 30 32 484 | 3/1981 | Germany . |
| 31 21 645 | 12/1982 | Germany . |
| 39 02 339 | 8/1990 | Germany . |

*Primary Examiner*—Jeffery A. Hofsass
*Assistant Examiner*—John Tweel, Jr.
*Attorney, Agent, or Firm*—Evenson, McKeown, Edwards & Lenahan, PLLC

[57] ABSTRACT

A display device, in particular a fault display, predominantly for systems of a motor vehicle, is provided wherein, as a rule, there is a display only after an operational shut-down of a respective system occurs or when the motor vehicle is switched off.

12 Claims, 1 Drawing Sheet

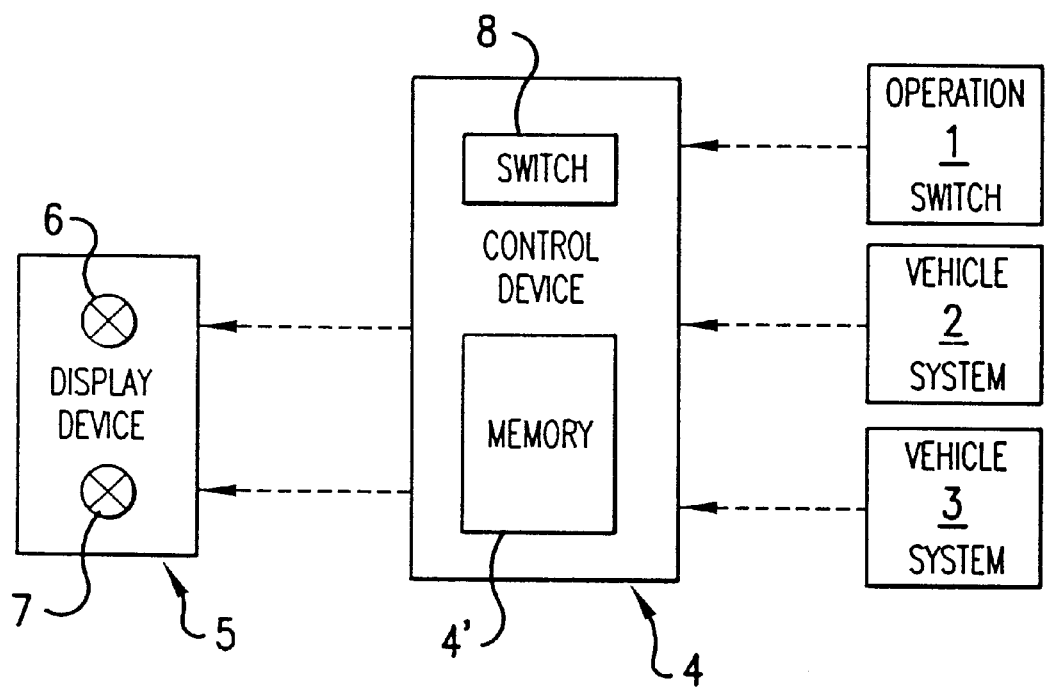

INDICATION DEVICE

BACKGROUND AND SUMMARY OF THE INVENTION

The invention relates to a display device for systems, in particular of a motor vehicle, which generates a warning signal or fault signal when there are predefined operating states and/or deviations from a set point operating state. These systems have a control device which is connected upstream of the display device and which stores the previously mentioned warning signals or fault signals.

Display devices and fault displays are generally customary in motor vehicles such as, for example, brake lining wear displays. In such displays a signalling light or the like is immediately switched on whenever the thickness of one of the brake linings (or pads) of a vehicle service brake drops below a predefined value.

Furthermore, motor vehicles may be equipped with monitoring devices which interrogate the respective operating state or fault signals of the motor vehicle systems which are generally specified, and store corresponding data over the long term. These data can then be displayed and/or converted into fault signals with a separate interrogation unit. Moreover, when a fault occurs, a display can be activated immediately. Appropriate arrangements are the subject-matter of German Patent document DE 32 29 411 A1 (having a counterpart in U.S. Pat. No. 5,019,799).

German Patent document DE 31 21 645 C2 discloses computer-aided control systems which are used for, among other things, controlling the engine and/or for controlling the ignition of the engine. They are also used for monitoring various vehicle systems and, in the process, storing status data and fault signals. In this way, the working capacity of the control systems can also be used for diagnostic purposes, i.e. the diagnostic interrogations can be carried out in the intervals between the control measures.

German Patent document DE 39 02 339 A1 relates to the acquisition of data in a battery-driven electric vehicle. Here, all the data of the vehicle and of the battery are collected and processed in an information processor and information store, and transmitted from there to a data evaluation unit.

The German Publication by B. Eberwein, W. Dörks entitled "Onboard—Diagnose—Ein Weg zu höherer Fahrzeugverfügbarkeit (On board diagnostics—a way of improving vehicle availability)" in "nachverkehrs-praxis (local) traffic practice)" No. 9/1995, pages 268 to 270, relates generally to the usefulness of automatic diagnostic systems in vehicles. They enable the maintenance of a fleet of vehicles to be significantly simplified.

European Patent document EP 0 308 944 A2 describes a fault diagnostic device for a vehicle control system. Here, fault messages are stored and recalled before repair or maintenance work is performed. In this context, EP 0 308 944 A2 treats the problem of preventing fault information which is erroneously stored from being displayed. For this purpose, it is proposed to suppress the display of an item of fault information if the fault message is not repeated within a predefined time period. However, suppressed fault information can also be displayed again, in order, for example, to facilitate the diagnostic work of a workshop. As soon as the vehicle's engine is switched off (via the ignition switch), the vehicle control system and the fault diagnostic device are shut down.

U.S. Pat. No. 4,447,801 relates to a diagnostic system which, when the ignition of a vehicle engine is switched on, illuminates appropriate displays if a fault is detected. In this context, mention is made of the problem wherein a driver typically tends to ignore such warning displays because too many displays are illuminated at the same time. U.S. Pat. No. 4,447,801 proposes various approaches to overcoming this problem:

(1) The warning displays may be generally tested before the vehicle is activated.
(2) Furthermore, the warning displays can be tested successively before the vehicle is activated.
(3) In addition, the warning displays can be switched on simultaneously and then successively switched off when the vehicle is activated.
(4) Finally, the warning displays can be activated successively at the request of the driver.

In each case, the warning displays may relate to status variables which are independent of the running of the vehicle engine.

There is therefore needed a display device which can advantageously avoid unnecessary distractions of the person monitoring the display device or of the driver of a motor vehicle.

These needs are met according to the invention by providing a display device having a control device, connected upstream of the display device, which stores warning signals and fault signals, and at least temporarily activates the display device when a switching-off signal which is generated when there is an operational shut-down of the monitored system or motor vehicle is received.

The invention is based on the general idea that operational states, which make measures necessary or desirable only after a relatively long delay, are displayed only when operation is terminated so that, in the example of a motor vehicle, only signals which are actually important are displayed to the driver while driving. This takes into account that it is as a rule desirable to monitor diverse systems and functions in a vehicle, but that the associated signal displays may distract the driver if they occur "at the wrong time". At the same time, allowance is made for the fact that a signal display which occurs continuously may easily be disregarded by the driver.

In the invention, it is advantageous that the activation of the display device during an operational shut-down particularly ensures that attention is paid to the display.

The invention provides the advantage that, if necessary, very diverse functions can be monitored, and signals can then also be generated if there is no direct need for action. This is because, owing to the invention, the signals cannot cause the operator or driver to be distracted during operation.

This also allows for the fact that a large number of systems are of redundant configurations so that relatively minor malfunctions of subsystems are in themselves negligible, but it should equally well be possible to detect them so that in each case preventive measures can be taken within an appropriate time frame.

According to one advantageous embodiment of the invention there may also, if appropriate, be provision for the display device or fault display to be activated briefly when a corresponding signal occurs, even when the respective system is operating, and to be activated again in the event of an operational shut-down.

Other objects, advantages and novel features of the present invention will become apparent from the following detailed description of the invention when considered in conjunction with the accompanying drawings.

BRIEF DESCRIPTION OF THE DRAWING

The single FIGURE shows a schematic block circuit diagram of a display device according to the invention in a motor vehicle.

DETAILED DESCRIPTION OF THE DRAWING

The motor vehicle (which is not shown in detail) has an operational switch 1 which is switched on to start a vehicle engine (not illustrated) and is switched off when the vehicle engine is switched off. For example, the operational switch 1 activates the ignition of the engine. During the switching-on and switching-off processes, signals which differ from one another can be tapped at an output of the operational switch 1. Furthermore, the motor vehicle has different systems 2 and 3 which are switched on and off together with the vehicle engine and generate an appropriate signal when there is a deviation from a set point operating state at an output. The aforesaid signals of the operating switch 1 and of the systems 2 and 3 are fed to a control device 4 which is arranged on the input side of the display device 5. The control device can be, for example, an appropriately programmed microprocessor based control unit. This display device has signal transmitters 6 and 7 which are separately assigned to the systems 2 and 3 and are activated by the control device 4.

According to the invention, the control device 4 operates as follows.

As soon as the control device 4 receives a switching-on signal from the operating switch 1, it activates the signal transmitters 6 and 7 for a limited time so that the operational capability of the signal transmitters 6 and 7 can be detected.

If one of the systems 2 or 3 deviates from its set point operating state and feeds a corresponding signal to the control device 4, this signal is stored in a memory 4' by the control device 4.

If appropriate, the control device 4 may then briefly activate the signal transmitter 6 or 7 for the respective system 2 or 3.

When a switching-off signal of the operating switch 1 is received, the control device 4 can check the memory 4' and, if a signal is stored there, can activate the respectively assigned signal transmitter 6 or 7 at least for a predefined time period.

If appropriate, the actuation of the signal transmitters 6 and 7 after the switching-off signal has been received from the operating switch 1 does not take place until a switch 8 which has been assigned to the control device 4 and/or the display device 5 is manually activated. This may be advantageous in particular if desirable signals are to be displayed only for inspection purposes.

The memory 4' can be cleared automatically and/or as desired as soon as the respective signal has been displayed after the vehicle has stopped operating or after the switch 1 has been switched off.

As will be readily understood, the control device 4 can perform the above operation using software, hardware, or some combination of both.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A display device for a vehicle, comprising:
    a display device capable of displaying a warning or fault signal when at least one of predefined operating states and deviations from a set point operating state of the vehicle occur;
    a control device coupled upstream of the display device, said control device including a memory for storing previously occurring warning or fault signals;
    wherein the control device at least temporarily activates the display device when a switching-off signal generated from an operational shut-down of a monitored system or the vehicle is received.

2. The display system according to claim 1, wherein the warning signal or fault signal is displayed on the display device briefly without delay.

3. The display system according to claim 1, wherein the display device includes at least one signal transmitter; and
    further wherein when a vehicle system is switched on or when the vehicle starts, the control device briefly activates at least one of the display device and the signal transmitter.

4. The display system according to claim 2, wherein the display device includes at least one signal transmitter; and
    further wherein when a vehicle system is switched on or when the vehicle starts, the control device briefly activates at least one of the display device and the signal transmitter.

5. The display system according to claim 1, wherein the memory in the control device stores signals of the vehicle systems.

6. The display system according to claim 5, wherein the memory can be cleared when desired.

7. The display system according to claim 5, wherein the memory can be cleared automatically after at least one of the display device and a respective signal transmitter has been activated.

8. The display system according to claim 6, wherein the memory can be cleared automatically after at least one of the display device and a respective signal transmitter has been activated.

9. A display system for a motor vehicle, comprising:
    a display;
    a control unit coupled to said display, said control unit receiving inputs from vehicle systems to be monitored;
    wherein said control device at least temporarily activates the display when a switching-off signal generated from an operational shut-off down of the vehicle system being monitored or the vehicle is received, said display displaying a signal indicative of an operational state of the vehicle system to be monitored.

10. A software product, comprising:
    a computer readable medium having stored thereon program code segments that:
        process signal information from predefined operating states and/or deviations from a set point operating state of a vehicle system;
        detect an operational shut-down of the vehicle system or the vehicle; and
        at least temporarily activate a display to provide the signal information when the operational shut-down occurs.

11. A method for displaying vehicle system information, the method comprising the acts of:
    storing signal information of predefined operating states and/or deviations from a set point operating state of a vehicle system;
    detecting an operational shut-down of the vehicle system or the vehicle; and
    at least temporarily activating a display device when the operational shut-down of the vehicle system or the vehicle is detected.

12. A vehicle display, comprising:
    at least one signal indicator which is at least temporarily activated to provide signal information about a vehicle system when an operational shut-down of the vehicle system or the vehicle occurs.

* * * * *